O. KJELLBERG.
ELECTRIC WELDING, BRAZING, OR SOLDERING.
APPLICATION FILED AUG. 13, 1907.
948,764.
Patented Feb. 8, 1910.
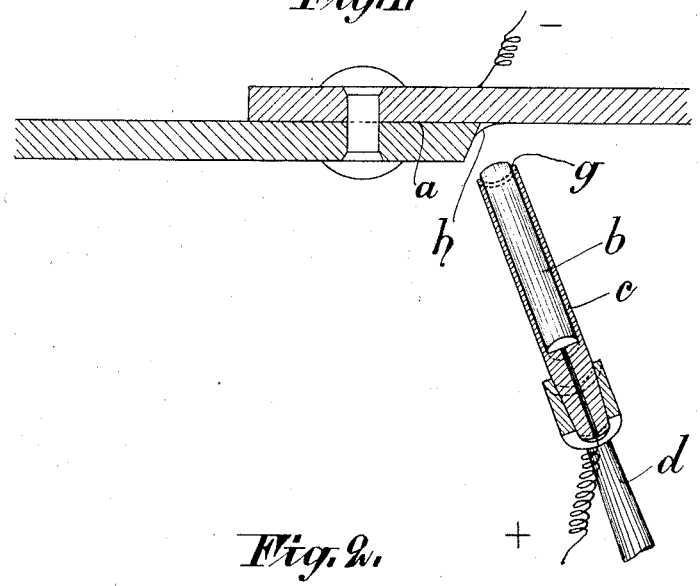
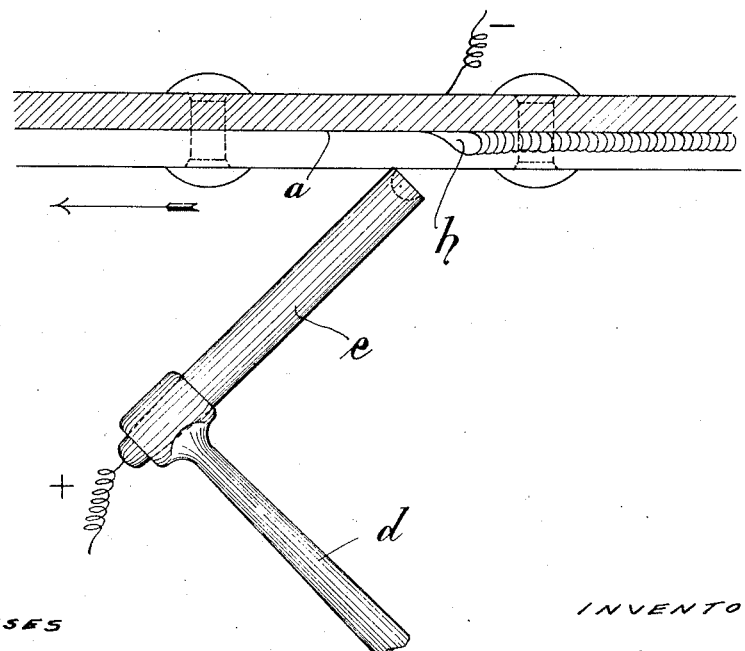
WITNESSES
W. P. Burke
W. G. Smith
INVENTOR
Oscar Kjellberg

UNITED STATES PATENT OFFICE.

OSCAR KJELLBERG, OF GOTTENBORG, SWEDEN.

ELECTRIC WELDING, BRAZING, OR SOLDERING.

948,764. Specification of Letters Patent. Patented Feb. 8, 1910.

Application filed August 13, 1907. Serial No. 388,395.

*To all whom it may concern:*

Be it known that I, OSCAR KJELLBERG, a subject of the King of Sweden, and resident of Stora Badhusgatan 7, Gottenborg, in the Kingdom of Sweden, have invented certain new and useful Improvements in or Relating to Electric Welding, Brazing, or Soldering, of which the following is a specification, reference being had therein to the accompanying drawing.

In methods of electric welding brazing or soldering hitherto known there are special difficulties in effecting connections on the under side of objects, as it is then difficult to apply the brazing or soldering metal to the joint. This is a great disadvantage in repairing objects which it is expensive to move or in such places where the space available for the workman is very limited, as for instance under steam ship boilers.

This invention relates to a simple and practical method of welding brazing or soldering electrically whereby the connections on the lower side of objects can easily be effected.

The brazing or soldering metal, which forms one of the electrodes, preferably the positive one, is provided with a cover of fireproof, normally non-conducting material that is to say a second class conductor which as the brazing or soldering metal is consumed, extends beyond the said metal at its edges and forms a crater like cavity, and serves as a guide for the molten brazing or soldering metal, which is moved by the electric current from the positive electrode to the negative one.

The thickness of the sleeve or cover is such, that it is removed automatically during the welding operation in the same proportion as the brazing or soldering metal and falls away without contaminating the said metal.

The accompanying drawing shows the welding of a joint, for instance on a steam boiler, according to this process.

Figures 1 and 2 are a side view and a front view respectively of a joint $a$, the electrode $e$ being in operative position.

$c$ is the fire-proof cover which extends beyond the welding metal $b$ at its edge $g$ and forms a guide for the molten metal.

The electrode $e$ is mounted in a handle or holder $d$ of a suitable construction.

The welding operation is effected in the following manner: After the cover has been removed from the end of the electrode $e$, the latter is approached to the joint $a$, whereby the current passes through the electrode metal $b$ and the edge $g$ which has been made conducting by sufficient heating. Thereby the defective place is heated at this point and the electrode metal $b$ when heated to the welding temperature is carried on and is pulled or sucked by the electric current from the positive electrode to the negative electrode i. e. to the defective place, so that the applied metal is nicely welded. The welding operation is continued successively as adjacent portions are heated to the welding temperature.

It may be observed that the electrode $e$ is always to be held at a sharp angle to the working or motive direction marked by an arrow in Fig. 2, the experience having proved that the electrode metal does not attach itself readily to the joint, but it bounds or sprinkles away if the electrode is held at right or obtuse angles.

The electrode is so carried, that the electrode metal is deposited in successive embankments or in layers $h$. When the electrode metal is used up, a new welding electrode $e$ is fixed in the holder $d$, the welding operation being then continued.

By way of example, the electrode cover may consist of chalk and magnesia, together with a binding substance as potassium, which produces simultaneously a reducing effect. Further, the electrode cover may contain such substances as for instance magnesium, titanium or vanadium, as impart to the welding place a suitable degree of hardness or another quality important to the executed connection by forming compounds or alloys with the soldering or brazing metal.

Having now particularly described and ascertained the nature of my said invention and in what manner the same is to be performed, I declare that what I claim is:—

1. The herein described method of welding, brazing or soldering with an electrode containing soldering material consisting in passing a current to form an arc between the electrode and the parts to be welded and then moving the electrode in a line parallel to the part where the solder is to be applied while held at a sharp angle to the line of movement, so that the soldering material will pass from the electrode in a continuous stream and be applied in rows and layers to the parts to be welded.

2. Means for welding, brazing or soldering by means of an electric arc, comprising a metallic electrode provided with a cover of non-combustible, normally non-conducting material which is adapted to fall off in the same proportion as the electrode metal is consumed.

3. An electrode for electric welding, brazing or soldering, composed of brazing or soldering metal provided with a cover of non-combustible normally non-conducting material, the said cover containing substances which will form compounds or alloys with the brazing or soldering metal.

In witness whereof, I have hereunto signed my name in the presence of two subscribing witnesses.

OSCAR KJELLBERG.

Witnesses:
E. K. THORSSON,
ERIK BERGSTRÖM.